United States Patent
Nakano et al.

(10) Patent No.: US 8,171,566 B2
(45) Date of Patent: May 1, 2012

(54) COPYRIGHT PROTECTION DATA PROCESSING SYSTEM AND REPRODUCTION DEVICE

(75) Inventors: Toshihisa Nakano, Osaka (JP); Kaoru Murase, Nara (JP)

(73) Assignee: Panasonic Corporation, Osaka (JP)

( * ) Notice: Subject to any disclaimer, the term of this patent is extended or adjusted under 35 U.S.C. 154(b) by 5 days.

(21) Appl. No.: 12/514,343

(22) PCT Filed: Feb. 22, 2008

(86) PCT No.: PCT/JP2008/000312
§ 371 (c)(1),
(2), (4) Date: May 11, 2009

(87) PCT Pub. No.: WO2008/102566
PCT Pub. Date: Aug. 28, 2008

(65) Prior Publication Data
US 2010/0058487 A1 Mar. 4, 2010

(30) Foreign Application Priority Data
Feb. 23, 2007 (JP) .................................. 2007-043411

(51) Int. Cl.
*G06F 7/04* (2006.01)
*G06F 17/30* (2006.01)
*H04N 7/16* (2011.01)

(52) U.S. Cl. .......... 726/30; 713/161; 713/165; 713/176; 713/187; 713/193; 726/26; 726/32; 380/201; 380/239; 711/102; 711/103; 711/163; 711/167

(58) Field of Classification Search .................. 713/193, 713/161, 165, 176, 187; 726/7, 26, 30, 32; 711/102, 103, 163, 167; 380/201, 239
See application file for complete search history.

(56) References Cited

U.S. PATENT DOCUMENTS

| 5,805,699 A | 9/1998 | Akiyama et al. |
| 6,028,936 A | 2/2000 | Hillis |

(Continued)

FOREIGN PATENT DOCUMENTS

EP 1 764 697 3/2007

(Continued)

OTHER PUBLICATIONS

International Search Report issued May 27, 2008 in the International (PCT) Application of which the present application is the U.S. National Stage.

(Continued)

*Primary Examiner* — Eleni Shiferaw
*Assistant Examiner* — Shewaye Gelagay
(74) *Attorney, Agent, or Firm* — Wenderoth, Lind & Ponack, L.L.P.

(57) ABSTRACT

If playback devices are prohibited from playing back contents recorded in R media, there occurs a problem that it takes more time to manufacture commercial ROM media. Conversely, if playback devices are permitted to play back contents recorded in R media, there occurs a problem that copyrights might be infringed. In view of these, the aim of the present invention is to provide a content protection data processing system and a playback device capable of determine whether to permit playback of a content recorded in a recording medium, based on a medium type of the recording medium and a signature type of a signature attached to a program. This enables both the protection of the copyright of the content and the efficient manufacturing of commercial ROM media.

14 Claims, 9 Drawing Sheets

U.S. PATENT DOCUMENTS

| | | |
|---|---|---|
| 6,772,133 B1 | 8/2004 | Kambayashi et al. |
| 6,941,283 B2 | 9/2005 | Kambayashi et al. |
| 7,058,284 B2 | 6/2006 | Zou et al. |
| 7,096,268 B1 | 8/2006 | Shoda et al. |
| 7,127,431 B2 | 10/2006 | Kambayashi et al. |
| 7,281,274 B2 | 10/2007 | Manning et al. |
| 7,389,272 B2 | 6/2008 | Kambayashi et al. |
| 7,761,465 B1 | 7/2010 | Nonaka et al. |
| 2002/0152387 A1 | 10/2002 | Asano |
| 2003/0050894 A1 | 3/2003 | Kambayashi et al. |
| 2003/0191954 A1 | 10/2003 | Kambayashi et al. |
| 2004/0030656 A1 | 2/2004 | Kambayashi et al. |
| 2004/0133519 A1* | 7/2004 | Nakayama et al. ............. 705/50 |
| 2004/0243814 A1 | 12/2004 | Nakano et al. |
| 2007/0065101 A1* | 3/2007 | Takashima ..................... 386/94 |
| 2007/0074032 A1 | 3/2007 | Adams et al. |
| 2010/0054698 A1 | 3/2010 | Isozaki et al. |
| 2010/0058487 A1 | 3/2010 | Nakano et al. |

FOREIGN PATENT DOCUMENTS

| | | |
|---|---|---|
| JP | 10-83297 | 3/1998 |
| JP | 2006-277389 | 10/2006 |
| RU | 2 251 146 | 4/2005 |
| WO | 02/082280 | 10/2002 |

OTHER PUBLICATIONS

United States Office Action issued Sep. 30, 2010 in U.S. Appl. No. 12/524,604.

United States Office Action issued Feb. 22, 2011 in U.S. Appl. No. 12/524,604.

United States Office Action issued Aug. 8, 2011 in U.S. Appl. No. 12/524,604.

Russian Notice of Allowance issued Jan. 26, 2012 in related Application No. 2009135397 (English language Translation).

* cited by examiner

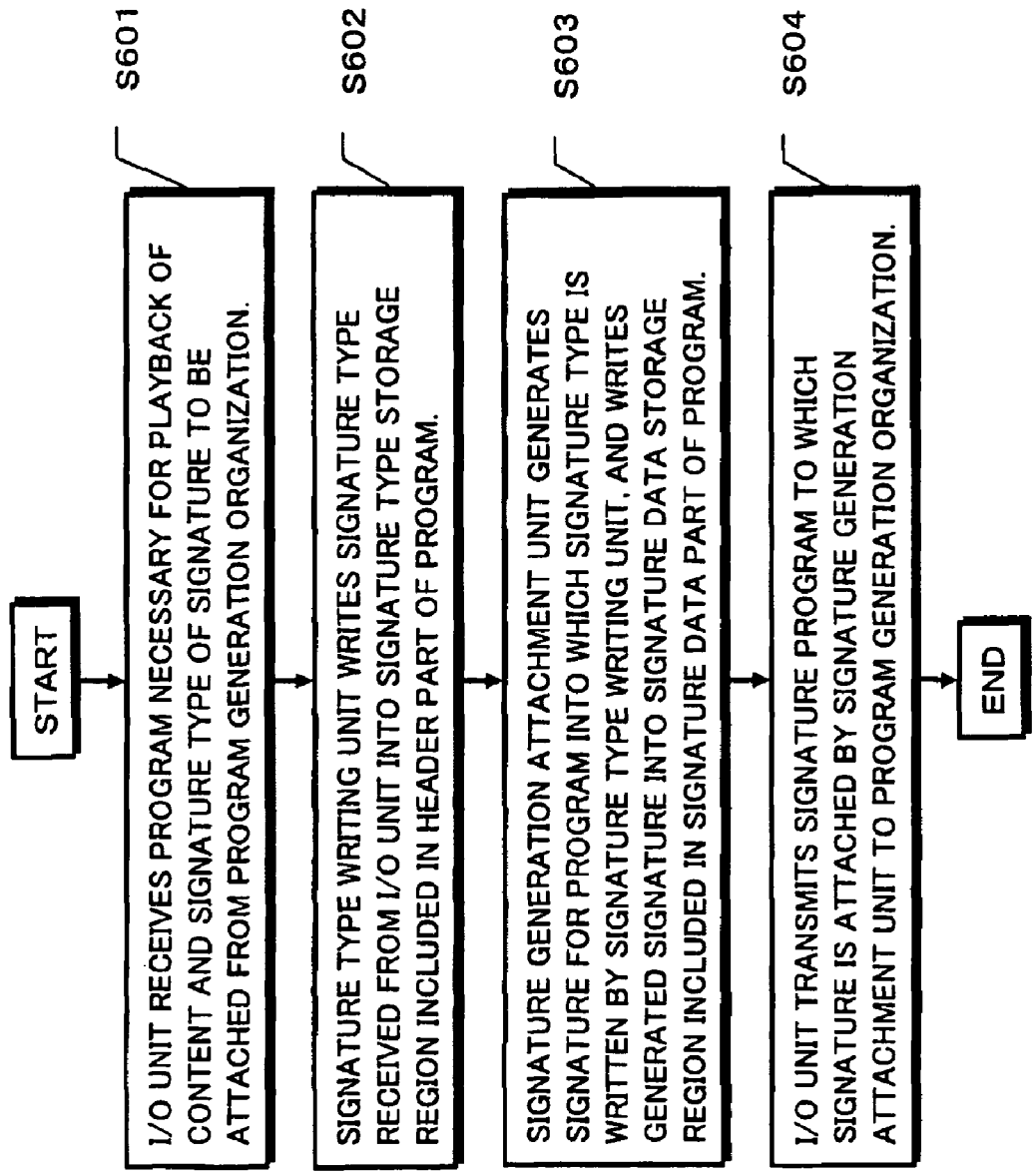

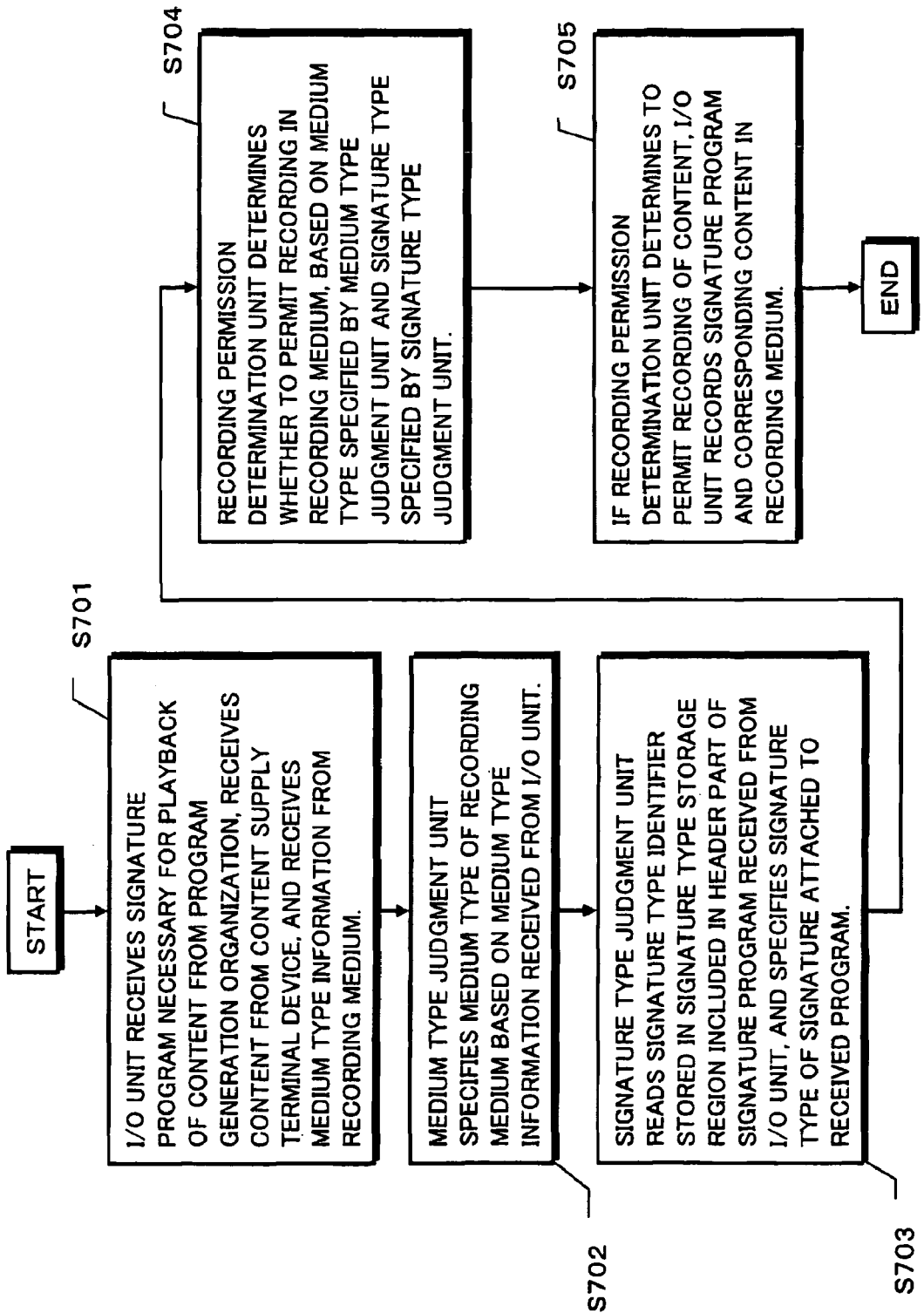

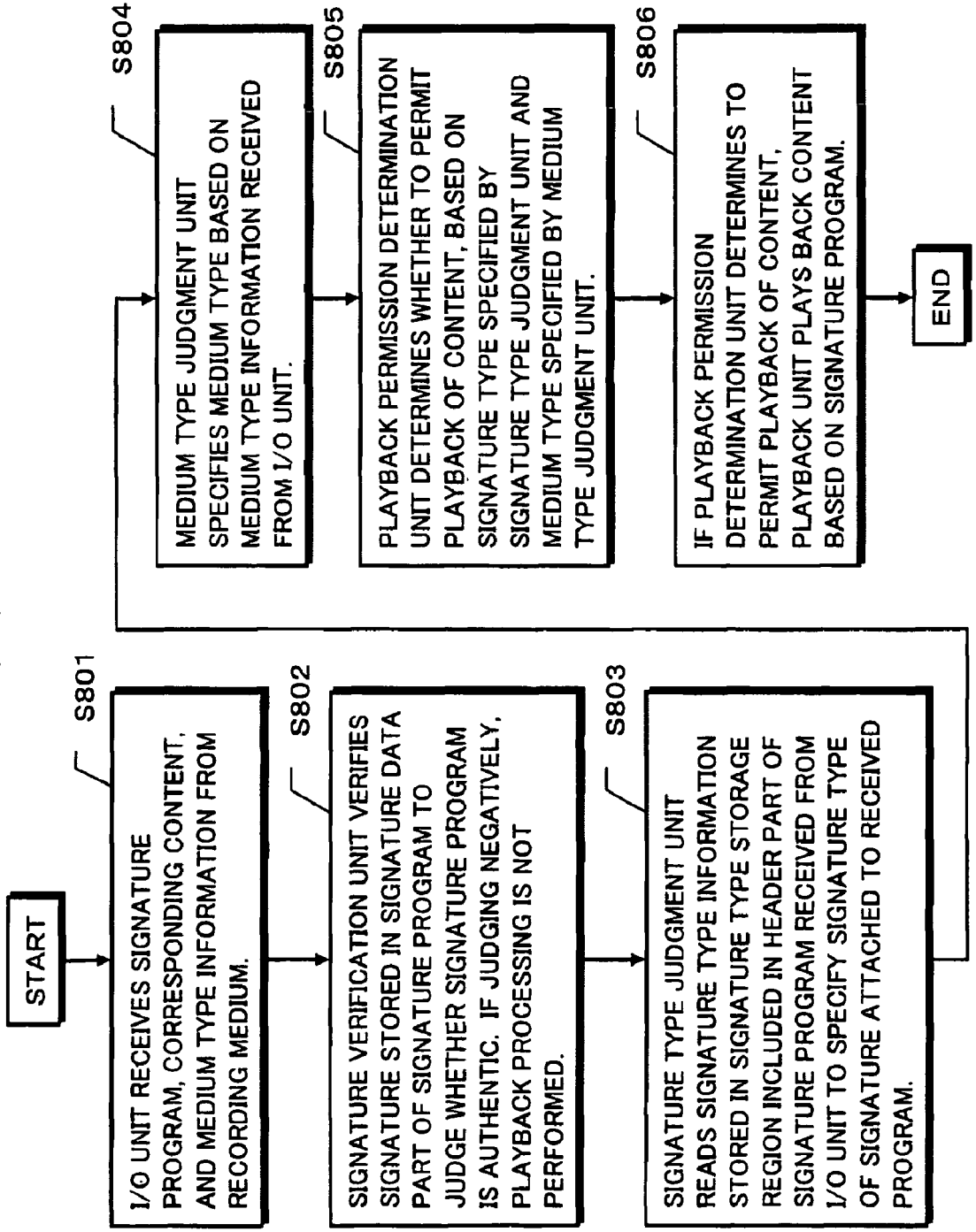

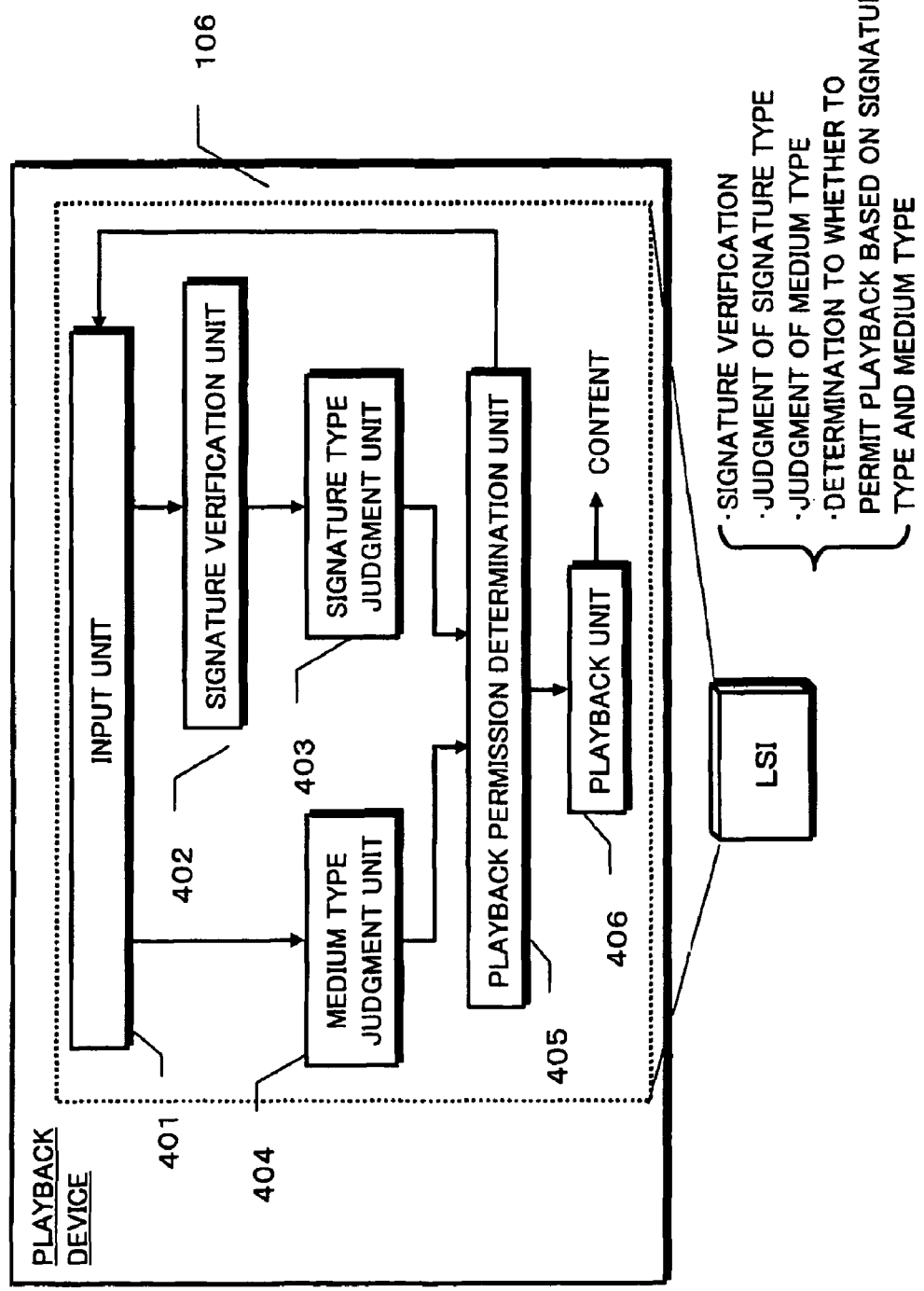

COPYRIGHT PROTECTION DATA PROCESSING SYSTEM AND REPRODUCTION DEVICE

TECHNICAL FIELD

The present invention relates to an art of protecting copyrights of digital contents such as movie and music.

BACKGROUND ART

In recent years, with the increase in storage capacities of recording media and the spread of broadband networks, there has become widespread a system in which digital contents are distributed by being recorded in recording media or via a broadband network. Note that the digital contents are generated by digitizing copyrighted works such as movie and music, and are hereinafter referred to just as "contents". In such a system, copyrights of contents need to be protected, and playback and copying of the contents need to be restricted under the agreement with copyright holders of the contents. As a conventional art for protecting copyright works against unauthorized acts such as copying of the copyright works without permission of copyright holders thereof, there has been known a method using an encryption technique. Also, there has been known a method of recording a program in a recording medium in addition to a content, and implementing a virtual machine that is an execution environment of the program in a playback device for playing back the content recorded in the recording medium. This art is disclosed in the Patent Document 1. When the recording medium is inserted into the playback device, the playback device reads the program from the inserted recording medium, and executes the read program in an execution environment (virtual machine) included therein. The content recorded in the recording medium is protected based on the program. When the program is executed, the protection of the content is cancelled, thereby enabling playback of the content.

On the other hand, in the process of manufacturing commercial recording media (hereinafter, referred to as "ROM media") having contents recorded therein, it is important to check the quality of the contents. It takes time to manufacture commercial ROM media. After frequent checking of the quality, the commercial ROM media are released in the market. Such commercial ROM media are generally manufactured by transferring the recorded contents to recording media such as R media and frequently performing the quality check of the contents and re-creation of the contents. Here, playback devices are capable of playing back both contents recorded in ROM media and contents recorded in R media. Also, it is impossible to judge whether a recording medium is an R medium manufactured for testing (quality check) in the process of manufacturing ROM media or an R medium manufactured by copying a ROM medium in an unauthorized manner. Accordingly, copyrights of contents might be infringed.
Patent Document 1: U.S. Pat. No. 7,058,284

DISCLOSURE OF THE INVENTION

Problems the Invention is Going to Solve

However, if playback devices are prohibited from playing back contents recorded in R media, there occurs a problem that it takes more time to manufacture commercial ROM media. Conversely, if playback devices are permitted to play back contents recorded in R media, there occurs a problem that copyrights might be infringed.

In view of these, the present invention aims to provide a copyright protection data processing system and a playback device capable of solving the above problems.

Means to Solve the Problems

In order to solve the above problem, the present invention provides a content playback device for playing back a digital content, the content playback device comprising: an information acquisition unit operable to acquire a content playback program to be used for playing back the digital content and signature type information from a recording medium in which the digital content, the content playback program, a digital signature attached to the content playback program, and the signature type information are recorded, the signature type information indicating whether a signature type of the digital signature is an official release type or a test release type; a medium type judgment unit operable to judge whether a medium type of the recording medium is a read-only type or a recordable type; a signature type judgment unit operable to judge whether the signature type information indicates the official release type or the test release type; and a playback permission determination unit operable to prohibit performing playback of the digital content by execution of the content playback program if the signature type information indicates the official release type and the judged medium type of the recording medium is the recordable type.

Also, the playback permission determination unit may permit performing playback of the digital content by execution of the content playback program if the signature type information indicates the test release type and the judged medium type is the recordable type.

Also, the playback permission determination unit may permit performing playback of the digital content by execution of the content playback program if the signature type information indicates the official release type and the judged medium type is the read-only type.

Also, the information acquisition unit may further acquire the digital signature, and the content playback device may further comprise a signature verification unit operable to perform verification of the digital signature after the digital signature has been acquired by the information acquisition, and prohibit the medium type judgment unit, the signature type judgment unit, and the playback permission determination unit from performing playback of the digital content if the verification of the digital signature is unsuccessful.

Also, the signature verification unit may store therein different verification keys for each of the signature types, and perform the verification with use of a verification key corresponding to the signature type indicated by the signature type information.

Also, the content playback device may further comprise: an encryption judgment unit operable to judge whether the digital content is encrypted if the playback permission determination unit permits performing playback of the digital content; a decryption key storage unit operable to store therein different decryption keys for each of the signature types; and a decryption unit operable to decrypt the digital content with use of a decryption key corresponding to the signature type indicated by the signature type information.

The present invention provides a content recording device for recording a digital content in a recording medium, the content recording device comprising: a storage unit operable to store therein the digital content, a content playback program to be used for playing back the digital content, and a digital signature that is attached to the content playback program and has a test release type or an official release type as a signature type; a signature type acquisition unit operable to acquire signature type information indicating whether the signature type of the digital signature is an official release type or a test release type; a medium type judgment unit operable to judge whether a medium type of the recording medium is a read-only type or a recordable type; a signature type judgment unit operable to judge whether the signature type information indicates the official release type or the test release type; and a recording permission determination unit operable to prohibit recording the digital content in the recording medium if the signature type information indicates the official release type and the judged medium type of the recording medium is the recordable type.

Also, the recording permission determination unit may permit recording the digital content in the recording medium if the signature type information indicates the official release type and the judged medium type is the read-only type.

Also, the content recording device may further comprise a signature verification unit operable to perform verification of the digital signature, and cause the recording permission determination unit to prohibit recording the digital content in the recording medium if the verification of the digital signature is unsuccessful.

Also, the signature verification unit may store therein different verification keys for each of the signature types, and performs the verification with use of a verification key corresponding to the signature type indicated by the signature type information.

The present invention provides a digital signature generation device for generating a digital signature for a content playback program to be used for playing back a digital content, the digital signature generation device comprising: an acquisition unit operable to acquire the content playback program and signature type information indicating whether a signature type of the digital signature to be attached to the content playback program is a test release type or an official release type; a signature generation attachment unit operable to generate a digital signature having the signature type indicated by the acquired signature type information, and attach the generated digital signature and the signature type information to the content playback program to generate a signature program having the digital signature and the signature type information attached thereto; and an output unit operable to output the generated signature program.

Also, the signature generation attachment unit may store therein different keys for signature generation for each of the signature types, and generate the digital signature with use of a key for signature generation corresponding to the signature type indicated by the acquired signature type information.

The present invention provides a content playback method of playing back a digital content, the content playback method comprising: an information acquisition step of acquiring a content playback program to be used for playing back the digital content and signature type information from a recording medium in which the digital content, the content playback program, a digital signature attached to the content playback program, and the signature type information are recorded, the signature type information indicating whether a signature type of the digital signature is an official release type or a test release type; a medium type judgment step of judging whether a medium type of the recording medium is a read-only type or a recordable type; and a signature type judgment step of judging whether the signature type information indicates the official release type or the test release type; and a playback permission determination step of prohibiting performing playback of the digital content by execution of the content playback program if the signature type information indicates the official release type and the judged medium type of the recording medium is the recordable type.

The present invention provides a content recording method of recording a digital content in a recording medium, the content recording method comprising: a storage step of storing the digital content, a content playback program to be used for playing back the digital content, and a digital signature that is attached to the content playback program and has a test release type or an official release type as a signature type; a signature type acquisition step of acquiring signature type information indicating whether the signature type of the digital signature is the official release type or the test release type; a medium type judgment step of judging whether a medium type of the recording medium is a read-only type or a recordable type; a signature type judgment step of judging whether the signature type information indicates the official release type or the test release type; and a recording permission determination step of prohibiting recording the digital content in the recording medium if the signature type information indicates the official release type and the judged medium type of the recording medium is the recordable type.

The present invention provides a digital signature generation method of generating a digital signature for a content playback program to be used for playing back a digital content, the digital signature generation method comprising: an acquisition step of acquiring the content playback program and signature type information indicating whether a signature type of the digital signature to be attached to the content playback program is a test release type or an official release type; a signature generation attachment step of generating a digital signature having the signature type indicated by the acquired signature type information, and attaching the generated digital signature and the signature type information to the content playback program to generate a signature program having the digital signature and the signature type information attached thereto; and an output step of outputting the generated signature program.

The present invention provides a content playback control program for use in a content playback device for playing back a digital content, the content playback control program comprising: an information acquisition step of acquiring a content playback program to be used for playing back the digital content and signature type information from a recording medium in which the digital content, the content playback program, a digital signature attached to the content playback program, and the signature type information are recorded, the signature type information indicating whether a signature type of the digital signature is an official release type or a test release type; a medium type judgment step of judging whether a medium type of the recording medium is a read-only type or a recordable type; a signature type judgment step of judging whether the signature type information indicates the official release type or the test release type; and a playback permission determination step of prohibiting performing playback of the digital content by execution of the content playback program if the signature type information indicates the official release type and the judged medium type of the recording medium is the recordable type.

The present invention provides an integrated circuit that relates to a content playback device for playing back a digital content, the integrated circuit comprising: an information acquisition unit operable to acquire a content playback program to be used for playing back the digital content and signature type information from a recording medium in which the digital content, the content playback program, a digital signature attached to the content playback program, and the signature type information are recorded, the signature type information indicating whether a signature type of the digital signature is an official release type or a test release type; a medium type judgment unit operable to judge whether a medium type of the recording medium is a read-only type or a recordable type; a signature type judgment unit operable to judge whether the signature type information indicates the official release type or the test release type; and a playback permission determination unit operable to prohibit performing playback of the digital content by execution of the content playback program if the signature type information indicates the official release type and the judged medium type of the recording medium is the recordable type.

The present invention provides a copyright protection data processing system composed of a signature generation device for generating a digital signature for a content playback program to be used for playing back a digital content, a content recording device for recording the digital content in a recording medium, and a content playback device for playing back the digital content, wherein the signature generation device comprises: a content playback program reception unit operable to receive, from the content recording device, the content playback program, signature type information indicating whether a signature type of the digital signature to be attached to the content playback program is a test release type or an official release type; a signature type recording unit operable to attach the signature type information to the content playback program; a signature generation attachment unit operable to generate a digital signature having the signature type indicated by the attached signature type information, and attach the generated digital signature to the playback program having the signature type information attached thereto to generate a signature program having the digital signature and the signature type information attached thereto; and a signature program transmission unit operable to transmit the generated signature program to the content recording device, the content recording device comprises: a storage unit operable to store therein the digital content and the content playback program; a signature type acquisition unit operable to acquire the signature type information; a content playback program transmission unit operable to transmit the content playback program and the acquired signature type information to the signature generation device; a signature program reception unit operable to receive the signature program from the signature generation device; a content recording unit operable to record the digital content and the signature program in the recording medium, and the content playback device comprises: an information acquisition unit operable to acquire the signature program from the recording medium; a signature type judgment unit operable to judge whether the signature type information indicates the official release type or the test release type; a medium type judgment unit operable to judge whether a medium type of the recording medium is a read-only type or a recordable type; and a playback permission determination unit operable to prohibit performing playback of the digital content by execution of the content playback program if the signature type information indicates the official release type and the judged medium type of the recording medium is the recordable type.

Effect of the Invention

According to the present invention with the above structures, it is possible to realize both the efficient manufacturing of commercial ROM media and the protection of copyrights of contents.

BRIEF DESCRIPTION OF THE DRAWINGS

FIG. 6 shows the operations of the signature generation device according to the embodiment;

FIG. 7 shows the operations of the recording device according to the embodiment;

FIG. 8 shows the operations of the playback device according to the embodiment; and FIG. 9 shows the structure of an LSI realizing the functions of the playback device according to the embodiment.

DESCRIPTION OF CHARACTERS

Figure 1:
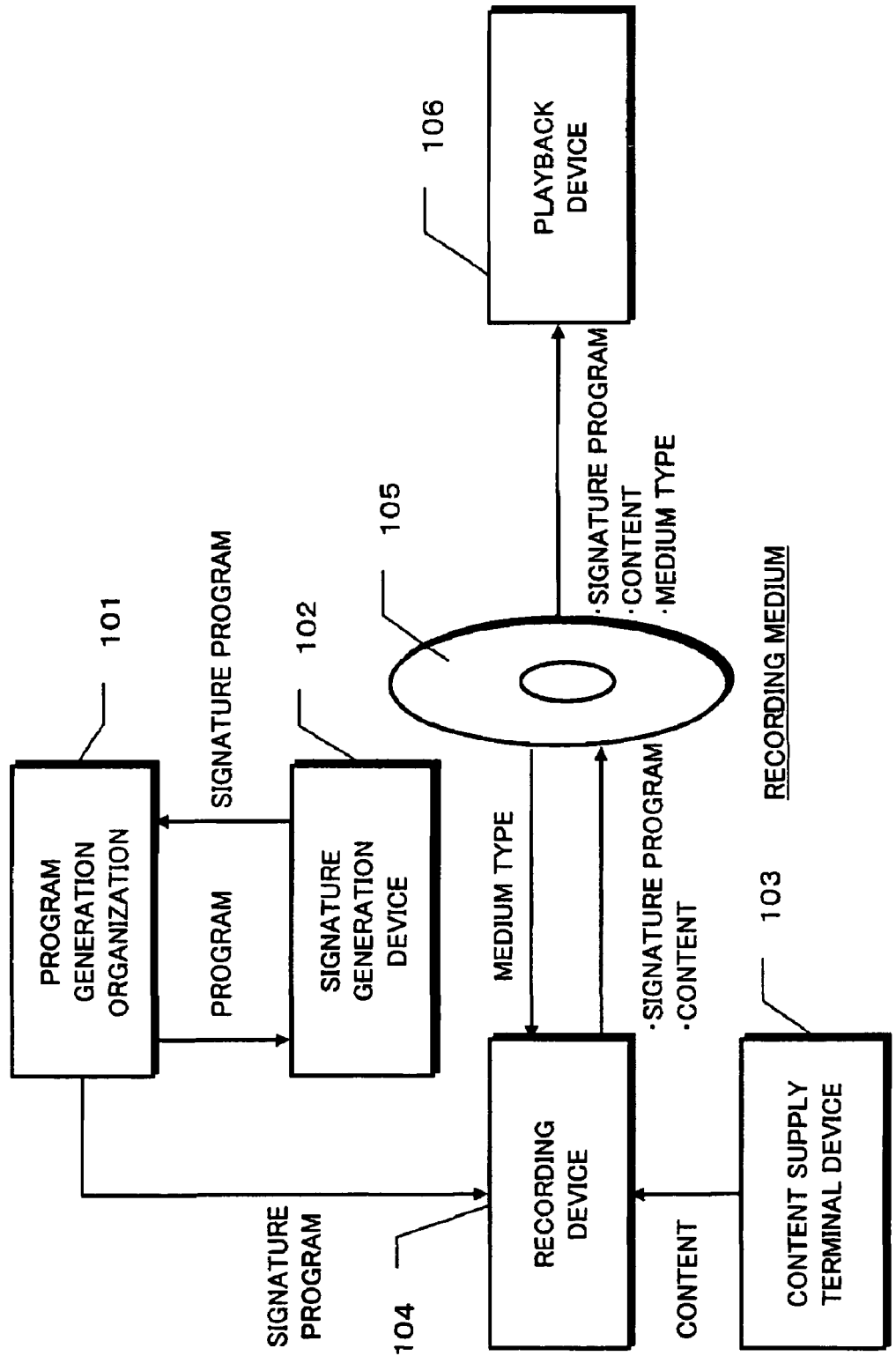
FIG. 1 is a block diagram showing the structure of a copyright protection data processing system according to an embodiment of the present invention.

101: program generation organization
102: signature generation device
103: content supply device
104: recording device
105: recording medium
106: playback device

BEST MODE FOR CARRYING OUT THE INVENTION

The following describes an embodiment of the present invention with reference to the drawings.

Embodiment 1.1 Structure of Copyright Protection Data Processing System

A copyright protection data processing system according to an embodiment of the present invention includes, as shown in FIG. 1, a program generation organization 101, a signature generation device 102, a content supply device 103, a recording device 104, a recording medium 105, and a playback device 106.

The program generation organization 101 generates a program necessary for playing back a content, transmits the generated program to the signature generation device 102, and receives a signature program having a signature attached thereto from the signature generation device 102.

The recording device 104 receives the signature program from the program generation organization 101, and receives a content protected by the signature program from the content supply device 103. Furthermore, the recording device 104 reads, from the recording medium 105, medium type information showing a medium type of the recording medium 105, and determines whether to permit recording of the received content. If determining to permit recording of the content, the recording device 104 records the received signature program and content in the recording medium 105.

The playback device 106 reads, from the recording medium 105, the signature program, the content, and the medium type information showing the medium type of the recording medium 105. Then, the playback device 106 determines whether to permit playback of the received content. If determining to permit playback of the content, the playback device 106 plays back the protected content by executing the signature program.

At this time, the content recorded in the recording medium 105 is protected by the program recorded in the same recording medium 105. As a method of protecting a content, it is possible to employ the structure in which a program calculates secret information in predetermined intervals, and encrypts the content using the secret information as key data, for example. An encryption technique used here may be a known method such as the DES encryption and the AES encryption. Furthermore, since an XOR operation based on the secret information may be employed instead of the encryption technique, the description of the method of content protection is omitted here.

1.2 Structure of Signature Generation Device 102

Figure 2:
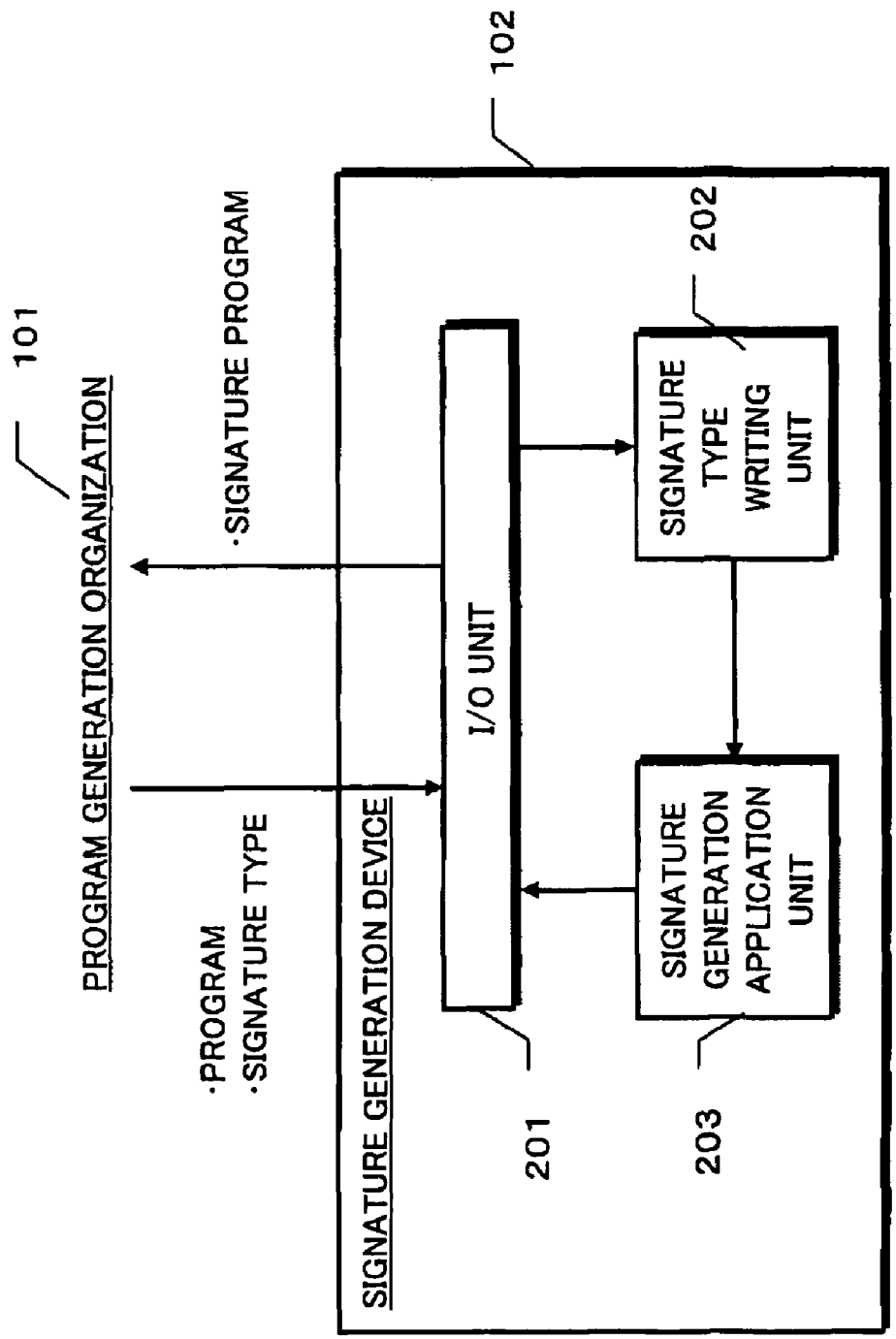
FIG. 2 is a block diagram showing the structure of a signature generation device according to the embodiment.

The signature generation device 102 includes, as shown in FIG. 2, an I/O unit 201, a signature type writing unit 202, and a signature generation attachment unit 203.

The signature generation device 102 is specifically composed of a microprocessor, a RAM, a ROM, a hard disk, and the like, though not shown in the figure. A computer program is stored in the RAM, the ROM, and the hard disk. Functions of the signature generation device 102 are achieved by the microprocessor operating in accordance with the computer program.

Note that each of the functional units of the signature generation device 102, such as the I/O unit 201, the signature type writing unit 202, and the signature generation attachment unit 203, is typically realized as an LSI that is an integrated circuit, may be separately integrated into one chip, or integrated into one chip including part or all of the functional units.

Here, the LSI may be called an IC, a system LSI, a super LSI, and an ultra LSI, depending on the integration degree.

Also, a method of forming integrated circuits is not limited to LSIs, and may be realized using a dedicated circuit or a general-purpose processor. Furthermore, it is possible to form integrated circuits with use of an FPGA (Field Programmable Gate Array) programmable after manufacturing LSIs or a reconfigurable processor in which connection and setting of the circuit cell inside an LSI can be reconfigured.

Furthermore, when a new technology for forming integrated circuits that replaces LSIs becomes available as a result of progress in semiconductor technology or semiconductor-derived technologies, the functional units may be integrated using such technology. One possibility lies in adaptation of biotechnology.

Finally, the functional units may be realized with software, or by combining an LSI and software. Also, the software may be tamper-resistant.

(1) I/O Unit 201

The I/O unit 201 receives, from the program generation organization 101, a program to which a signature is to be attached and a request for signature type of the signature to be attached to the program (test signature or official release signature).

Also, the I/O unit 201 receives, from the signature generation attachment unit 203, a program in which a signature generated by the signature generation attachment unit 203 is recorded, and transmits the received program to the program generation organization 101.

(2) Signature Type Writing Unit 202

The signature type writing unit 202 writes the requested signature type received by the I/O unit 201 into the program received by the I/O unit 201.

Figure 5:
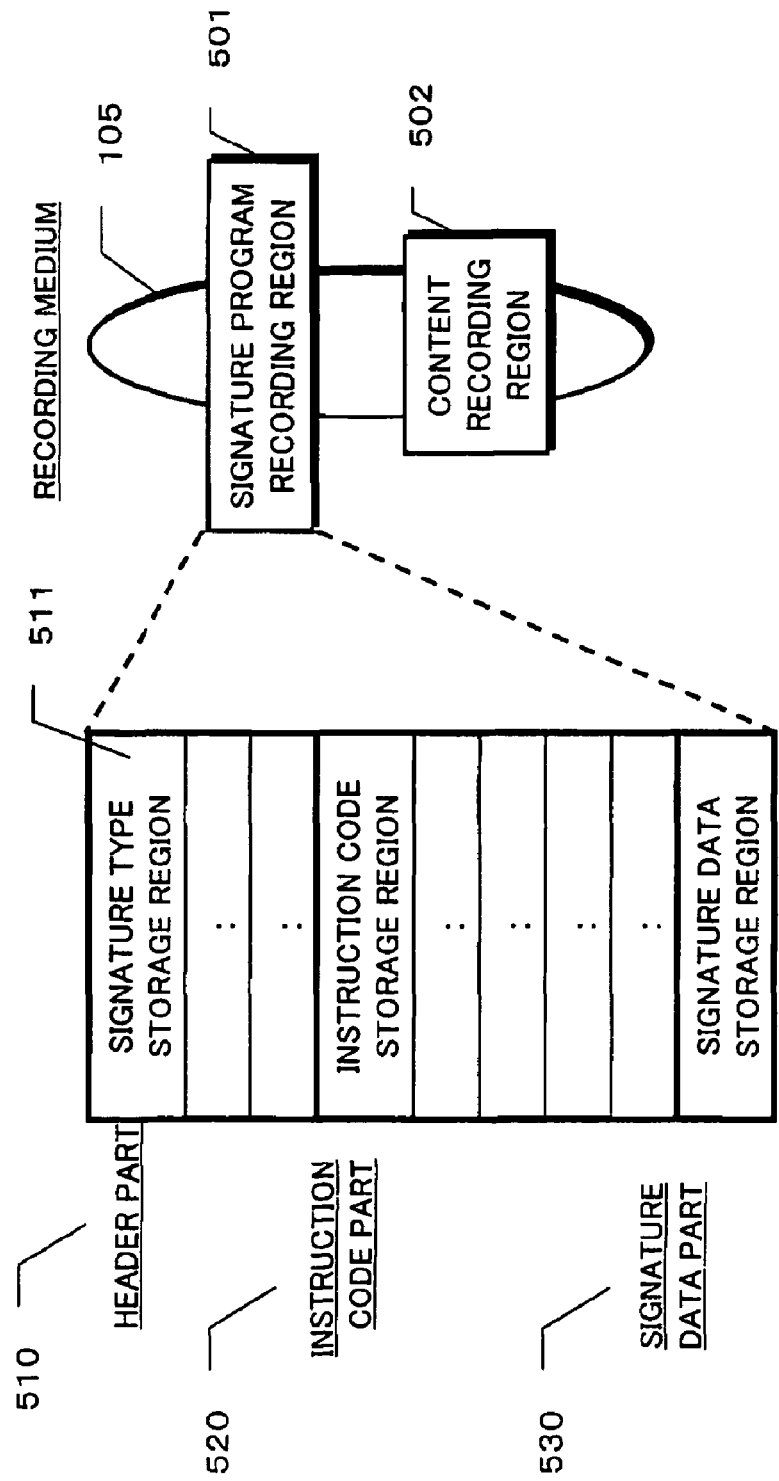
FIG. 5 shows an example of a signature program according to the embodiment.

FIG. 5 shows an example of the data structure of a program. The program is composed of a header part 510, an instruction code part 520, and a signature data part 530. The signature type writing unit 202 writes the signature type requested by the program generation organization 101 into a signature type storage region 511 included in the header part 510. For example, if the test signature is requested, the signature type writing unit 202 writes signature type information "0x01" into the signature type storage region 511. If the official release signature is requested, the signature type writing unit 202 writes signature type information "0x10" into the signature type storage region 511. Also, instruction codes are stored in an instruction code storage region included in the instruction code part 520. Furthermore, signatures generated by the signature generation device 102 are stored in a signature data storage region included in the signature data part 530.

(3) Signature Generation Attachment Unit 203

The signature generation attachment unit 203 generates a signature for the program into which the signature type is written, and records the generated signature in the signature data storage region included in the signature data part 530 of the program. Then, the signature generation attachment unit 203 transmits the program in which the generated signature is recorded (hereinafter, referred to as "signature program") to the I/O unit 201.

1.3 Structure of Recording Device 104

Figure 3:
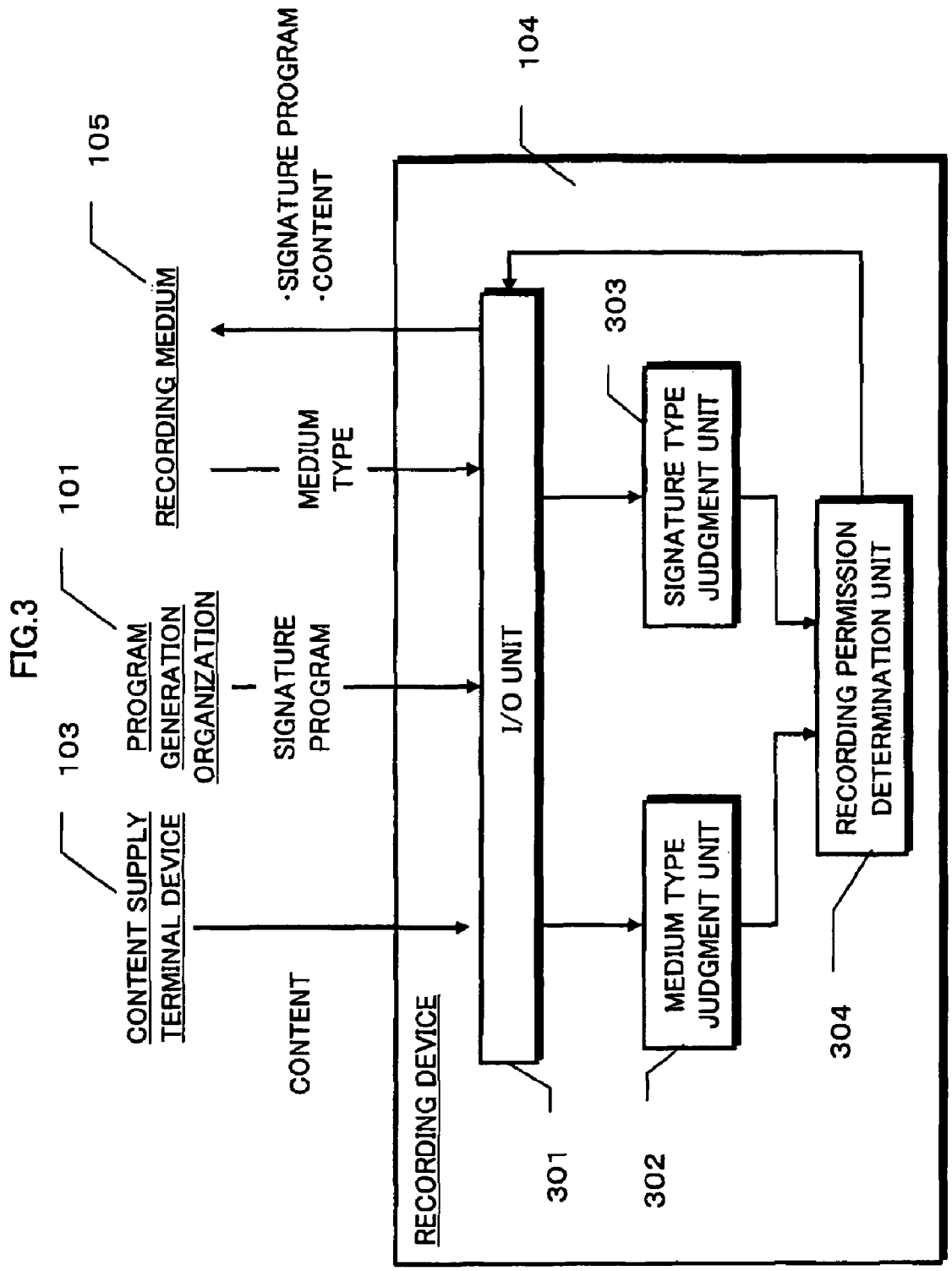
FIG. 3 is a block diagram showing the structure of a recording device according to the embodiment.

The recording device 104 includes, as shown in FIG. 3, an I/O unit 301, a medium type judgment unit 302, a signature type judgment unit 303, and a recording permission determination unit 304.

The recording device 104 is specifically composed of a microprocessor, a RAM, a ROM, a hard disk, and the like, though not shown in the figure. A computer program is stored in the RAM, the ROM, and the hard disk. Functions of the recording device 104 are achieved by the microprocessor operating in accordance with the computer program.

Note that each of the functional units of the recording device 104, such as the I/O unit 301, the medium type judgment unit 302, the signature type judgment unit 303, and the recording permission determination unit 304, is typically realized as an LSI that is an integrated circuit. These functional units may be separately integrated into one chip, or integrated into one chip including part or all of the functional units.

Here, the LSI may be called an IC, a system LSI, a super LSI, and an ultra LSI, depending on the integration degree.

Also, a method of forming integrated circuits is not limited to LSIs, and may be realized using a dedicated circuit or a general-purpose processor. Furthermore, it is possible to form integrated circuits with use of an FPGA programmable after manufacturing LSIs or a reconfigurable processor in which connection and setting of the circuit cell inside an LSI can be reconfigured.

Furthermore, when a new technology for forming integrated circuits that replaces LSIs becomes available as a result of progress in semiconductor technology or semiconductor-derived technologies, the functional units may be integrated using such technology. One possibility lies in adaptation of biotechnology.

Finally, the functional units may be realized with software, or by combining an LSI and software. Also, the software may be tamper-resistant.

(1) I/O Unit 301

The I/O unit 301 receives a signature program from the program generation organization 101, and receives a content from the content supply device 103, and furthermore reads medium type information from the recording medium 105.

Also, if judging to permit recording of the received content and signature program, the I/O unit 301 records the content and the signature program in the recording medium 105.

(2) Medium Type Judgment Unit 302

The medium type judgment unit 302 specifies a medium type based on the medium type information read by the I/O unit 301, and transmits the specified medium type to the recording permission determination unit 303.

Here, the medium type indicates a medium type of recording medium, such as a ROM (Read Only Memory), an R (Recordable), and an RW (ReWritable). Since the medium type can be identified with use of a known method such as an identification method that uses an identifier (ID) recorded on a recording medium, the description thereof is omitted here. In the following descriptions, identifiers "0x001", "0x010", and "0x100" are respectively recorded in the ROM, the R, and the RW, as an example.

(3) Signature Type Judgment Unit 303

The signature type judgment unit 304 reads signature type information stored in a signature type storage region 511 included in a header part 510 of the signature program received by the I/O unit 301, and specifies a signature type of the signature, and transmits the specified signature type to the recording permission determination unit 303.

(4) Recording Permission Determination Unit 304

The recording permission determination unit 304 determines whether to permit recording of the content and the signature program, based on both the medium type specified by the medium type judgment unit 302 and the signature type specified by the signature type judgment unit 303.

Specifically, if the medium type and the signature type are respectively specified as R (0x010) and test signature (0x01), the recording permission determination unit 304 permits recording of the content and the signature program in the recording medium. If the medium type and the signature type are respectively specified as R (0x010) and official release signature (0x10), the recording permission determination unit 304 prohibits recording of the content and the signature program in the recording medium.

1.4 Structure of Playback Device 106

Figure 4:
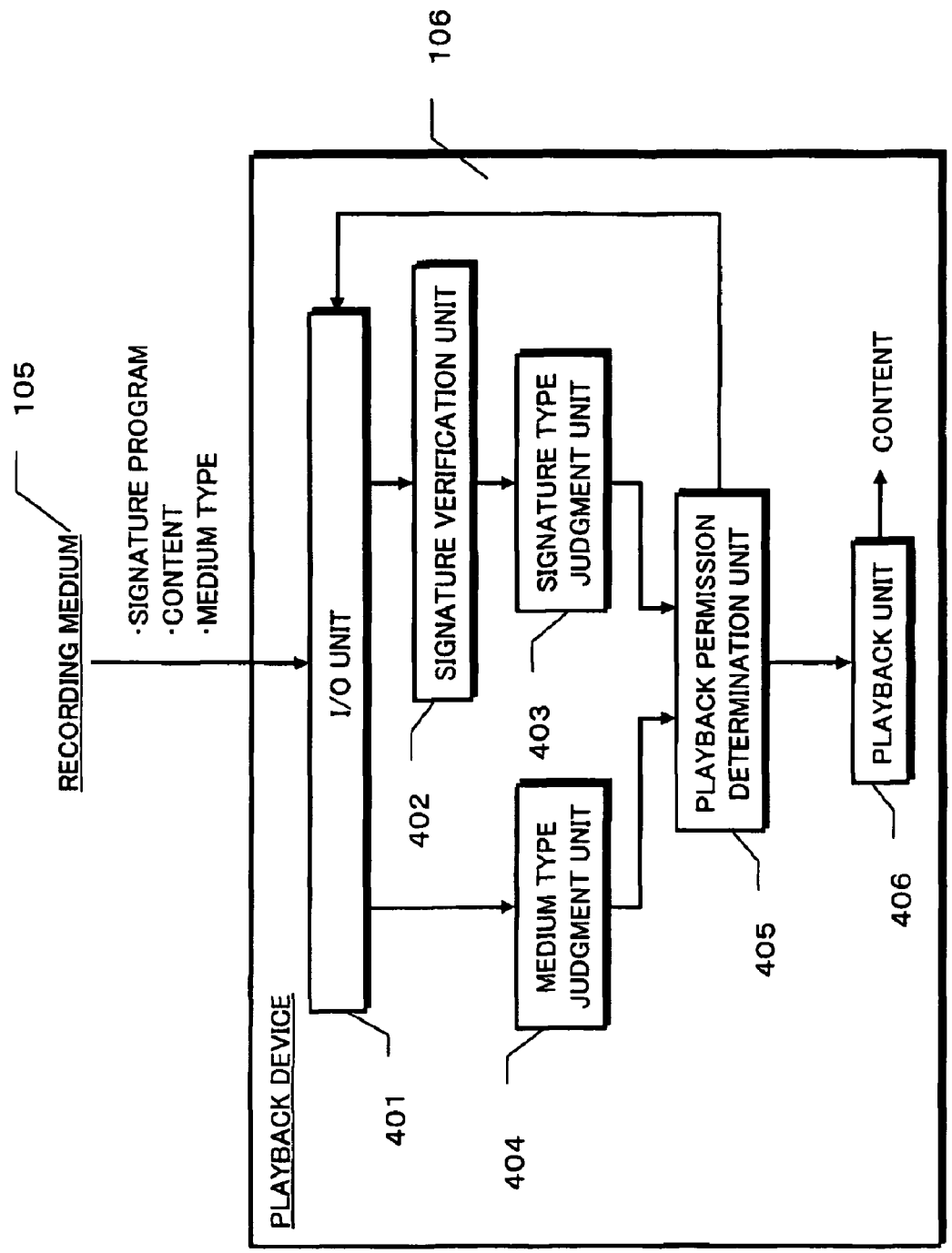
FIG. 4 is a block diagram showing the structure of a playback device according to the embodiment.

The playback device 106 includes, as shown in FIG. 4, an I/O unit 401, a signature verification unit 402, a signature type judgment unit 403, a medium type judgment unit 404, a playback permission determination unit 405, and a playback unit 406.

The playback device 106 is specifically composed of a microprocessor, a RAM, a ROM, a hard disk, and the like, though not shown in the figure. A computer program is stored in the RAM, the ROM, and the hard disk. Functions of the playback device 106 are achieved by the microprocessor operating in accordance with the computer program.

Note that each of the functional units of the playback device 106, such as the I/O unit 401, the signature verification unit 402, the signature type judgment unit 403, the medium type judgment unit 404, the playback permission determination unit 405, and the playback unit 406, is typically realized an LSI that is an integrated circuit. These functional units may be separately integrated into one chip, or integrated into one chip including part or all of the functional units. FIG. 9 shows an example of the manufacture of the system LSI. In FIG. 9, the functional units surrounded by a dashed line are integrated into one chip as an LSI.

Here, the LSI may be called an IC, a system LSI, a super LSI, and an ultra LSI, depending on the integration degree.

Also, a method of forming integrated circuits is not limited to LSIs, and may be realized using a dedicated circuit or a general-purpose processor. Furthermore, it is possible to form integrated circuits with use of an FPGA programmable after manufacturing LSIs or a reconfigurable processor in which connection and setting of the circuit cell inside an LSI can be reconfigured.

Furthermore, when a new technology for forming integrated circuits that replaces LSIs becomes available as a result of progress in semiconductor technology or semiconductor-derived technologies, the functional units may be integrated using such technology. One possibility lies in adaptation of biotechnology.

Finally, the functional units may be realized with software, or by combining an LSI and software. Also, the software may be tamper-resistant.

(1) I/O Unit 401

The I/O unit 401 reads a signature program, a content, and medium type information from the recording medium 105, and transmits the read signature program to the signature verification unit 402, and transmits the read medium type information to the medium type judgment unit 404.

(2) Signature Verification Unit 402

The signature verification unit 402 verifies a signature stored in a signature data part 530 of a signature program read by the I/O unit 401, and judges whether the program is an authentic program. Also, it is possible to check the completeness of the program by performing signature verification. For example, it is possible to check whether signature type information stored in a signature type storage region 511 included in a header part 510 of the program is not tampered with. If judging that the program is not an authentic program as a result of the signature verification, the playback device 106 does not perform subsequent playback processing, and stops the operations.

(3) Signature Type Judgment Unit 403

The signature type judgment unit 403 reads the signature type information stored in the signature type storage region 511 included in the header part 510 of the signature program received by the I/O unit 401 to specify a signature type, and transmits the specified signature type to the playback permission determination unit 405.

(4) Medium Type Judgment Unit 404

The medium type judgment unit 404 specifies a medium type based on the medium type information read by the I/O unit 401, and transmits the specified medium type to the playback permission determination unit 405.

Here, the medium type indicates a medium type of recording medium, such as a ROM (Read Only Memory), an R (Recordable), and an RW (ReWritable). Since the medium type can be identified with use of a known method such as an identification method that uses an identifier (ID) recorded on a recording medium, the description thereof is omitted here. In the following descriptions, identifiers "0x001", "0x010", and "0x100" are respectively recorded in the ROM, the R, and the RW, as an example.

(5) Playback Permission Determination Unit 405

The playback permission determination unit 405 determines whether to permit playback of the content using the signature program, based on both the medium type specified by the medium type judgment unit 404 and the signature type specified by the signature type judgment unit 403.

Specifically, if the medium type and the signature type are respectively specified as R (0x010) and test signature (0x01), the playback permission determination unit 405 permits playback of the content. If the medium type and the signature type are respectively specified as R (0x010) and official release signature (0x10), the playback permission determination unit 405 prohibits playback of the content. This is because the combination of R and test signature indicates that the recording medium is an R medium manufactured for test purpose in the manufacturing process of a ROM medium, and the combination of R and official release signature indicates that the recording medium is an R medium manufactured by copying a ROM medium in an unauthorized manner.

(6) Playback Unit 406

If the playback permission determination unit 405 permits playback of the content, the playback unit 406 executes a signature program read from the recording medium 105, in an execution environment thereof. Then, the playback unit 406 descrambles the content that has been scrambled (data that has been modified) based on secret information calculated using the program, so as to play back the content.

1.5 Operations of Signature Generation Device 102

The operations of the signature generation device 102 are described with reference to FIG. 6.

The I/O unit 201 included in the signature generation device 102 receives, from the program generation organization 101, a program necessary for playing back a content and a request for signature type of a signature to be attached to the program (test signature or official release signature) (Step S601). Based on the requested signature type received from the I/O unit 201, the signature type writing unit 202 writes signature type information into the signature type storage region 511 included in the header part 510 of the received program ("0x01" in case of test signature and "0x10" in case of official release signature) (Step S602).

The signature generation attachment unit 203 generates a signature for the program into which the signature type information is written by the signature type writing unit 202 in Step S602, and writes the generated signature into the signature data storage region included in the signature data part 530 of the program (Step S603). The I/O unit 201 transmits the signature program to which the signature is attached by the signature generation attachment unit 203 to the program generation organization 101 (Step S604).

1.6 Operations of Recording Device 104

The operations of the recording device 104 are described with reference to FIG. 7.

The I/O unit 301 included in the recording device 104 receives the signature program necessary for playing back the content from the program generation organization 101, receives the content from the content supply device 103, and receives medium type information from the recording medium 105 (Step S701). The medium type judgment unit 302 specifies a medium type of the recording medium (for example, ROM, R, or RW) based on the medium type information received from the I/O unit 301, and transmits the specified medium type to the recording permission determination unit 304 (Step S702).

The signature type judgment unit 303 reads signature type information stored in the signature type storage region 511 included in the header part 510 of the signature program received from the I/O unit 301, and specifies a signature type of the signature attached to the received program (test signature or official release signature), and transmits the specified signature type to the recording permission determination unit 304 (Step S703). Based on both the medium type received from the medium type judgment unit 302 and the signature type received from the signature type judgment unit 303, the recording permission determination unit 304 determines whether to permit recording of the received signature program and content in the recording medium 105 (Step S704).

If the recording permission determination unit 304 determines to permit recording of the content, the I/O unit 301 records the signature program and the corresponding content in the recording medium 105 (Step S705).

1.7 Operations of Playback Device 106

The operations of the playback device 106 are described with reference to FIG. 8.

The I/O unit 401 included in the playback device 106 reads the signature program necessary for playing back the content, the corresponding content, and the medium type information from the recording medium 105 (Step S801). The signature verification unit 402 verifies the signature stored in the signature data part 530 of the signature program received from the I/O unit 401, to judge whether the signature program is an authentic program. If judging that the program is not an authentic program, the subsequent playback processing is not performed (Step S802).

The signature type judgment unit 403 reads signature type information stored in the signature type storage region 511 included in the header part 510 of the signature program received from the I/O unit 401 to specify the signature type of the signature attached to the received program (test signature or official release signature), and transmits the specified signature type to the playback permission determination unit 405 (Step S803). The medium type judgment unit 404 specifies a medium type (ROM, R, or RW, for example) based on the medium type information received from the I/O unit 401, and transmits the specified medium type to the playback permission determination unit 405 (Step S804).

The playback permission determination unit 405 determines whether to permit playback of the received content, based on both the recording medium received from the medium type judgment unit 404 and the signature type received from the signature type judgment unit 403 (Step S805). If the playback permission determination unit 405 determines to permit playback of the content, the playback unit 406 executes the signature program read from the recording medium 105 in an execution environment included in the playback unit 406, and the playback unit 406 descrambles the content that has been scrambled (data that has been modified) based on secret information calculated using the program, so as to play back the content (Step S806).

Modification Examples

While the present invention has been described based on the above embodiment, the present invention is of course not limited to the above embodiment. The present invention also includes the following cases.

(1) In the above embodiment, the signature generation device receives a request for signature type, and writes the signature type into a program which is received together with the request. The present invention is not limited to this structure. Alternatively, the following structure may be employed, for example: the signature generation device stores therein both a pair of public keys for signatures having test release type and a pair of public keys for signatures having official release type, and uses a different key for generating a signature depending on a requested signature type instead of writing signature type information. Further alternatively, the following structure may be employed: the signature generation device writes signature type information into a header part of a program, and furthermore uses a different key for generating a signature depending on a requested signature type.

(2) In the above embodiment, the two signature types are used, namely the test release type and the official release type. The present invention is not limited to this structure. Alternatively, it may be employ two or more types, such as a test release type for ROM media, a test release type for R media, an official release type for ROM media, and downloaded content type, instead of the test release type and the official release type. Similarly, the medium type is not limited to the three types, namely the ROM, the R, and the RW. Furthermore, the present invention is not limited to the structure in which a judgment on whether test release type or official release type is made based on a signature type of a signature attached to a program. Alternatively, it may be possible to employ the structure, for example, in which a signature is attached not to a program but to a content, and the judgment is made based on a signature type of the signature attached to the content. Further alternatively, the judgment may be made based on information recorded in the recording medium independently from the content and the program. In other words, as long as information that enables appropriate judgment on whether test release type or official release type is recorded in the recording medium, the information does not necessarily need to be in a form of signature type.

(3) In the above embodiment, a content recorded in a recording medium is protected by a program recorded in the same recording medium. The present invention is not limited to this structure. Alternatively, the following structure may be employed. For example, in addition to protection of the content by a program (for example, with use of secret information calculated by operations of the program, the content is scrambled or values of data are partially modified), the content is further protected by being encrypted. Further alternatively, the content may be protected using two or more copyright protection techniques. In this case, the recording permission determination unit of the recording device and the playback permission determination unit of the playback device may respectively determine whether to permit recording and playback of the content, based on whether the content is encrypted using a second copyright protection technique or whether the content has a signature attached thereto using the second copyright protection technique, in addition to the medium type and the signature type. For example, if the medium type and the signature type are respectively specified as R and official release and the content is encrypted using the second copyright protection technique or the content has a signature attached thereto using the second copyright protection technique, the recording permission determination unit and the playback permission determination unit respectively may permit recording and playback of the content. Also, if the medium type and the signature type are respectively specified as R and official release, and the content is not encrypted using the second copyright protection technique, and the content does not have a signature attached thereto using the second copyright protection technique, the recording permission determination unit and the playback permission determination unit respectively may prohibit recording and playback of the content.

(4) In the above embodiment, the recording device determines whether to permit recording of a content based on both a medium type and a signature type. The present invention is not limited to this structure. Alternatively, whether to permit recording may be determined based on one of the medium type and the signature type. Further alternatively, the following system may be employed. For example, the recording device records the content without making a determination on whether to permit recording of the content, and then the playback device determines whether to permit playback of the content. Further alternatively, after verifying a signature attached to the program, the recording device may determine whether to permit recording of the content by specifying a signature type of the attached signature.

(5) In the above embodiment, after verifying a signature, the playback device specifies a signature type of the signature. The present invention is not limited to this structure. Alternatively, the following structure may be employed, for example: after specifying the signature type, the playback device verifies the signature. Further alternatively, in the structure in which keys for generating signatures differ between signature types, the playback device may verify the signature using a key corresponding to the specified signature type. The same also applies to the case of recording by the recording device.

(6) In the above embodiment, the playback device determines whether to permit playback of a content based on a medium type and a signature type. The present invention is not limited to this structure. Alternatively, the following structure may be employed. For example, if the medium type is judged to be a ROM, the playback device verifies a signature. If the program is judged to be an authentic program as a result of the verification, the playback device permits playback of the content, regardless of which signature type the signature has. On the other hand, if the medium type is judged to be a medium other than a ROM, the playback device determines whether to permit playback of the content with reference to the signature type. In this way, the step of referring to the signature type may be skipped depending on the judged medium type. Furthermore, the step of referring to the medium type may be skipped depending on the specified signature type, conversely. Moreover, if an encryption method or a signature method according to the second copyright protection technique is used for protecting a content, the step of referring to the medium type or the step of referring to the signature type may be skipped depending on whether the content is protected using the second copyright protection technique. The same also applies to the case of recording by the recording device.

(7) In the above embodiment, the recording device records a content and a program in a recording medium, and transmits the recorded content and program to the playback device. The present invention is not limited to this structure. Alternatively, for example, only the content may be recorded in the recording medium, and the program may be transmitted to the playback device via a network. Further alternatively, only the program may be recorded in the recording medium, and the content may be transmitted to the playback device via a network, on the contrary. Further alternatively, both the content and the program may be transmitted to the playback device via a network without being recorded in the recording medium. In this case, judgment on whether to permit playback of the content is made based on the signature type and whether the content is protected (the content is encrypted or has a signature attached thereto) using the second copyright protection technique.

(8) The recording device according to the above embodiment may include an instruction reception unit operable to receive one of an instruction to encrypt a content or an instruction to generate a signature for the content and attach the generated signature to the content or receive a signature for the content and attach the received signature to the content. The recording device may determine whether to permit recording of the content, based on the above received instruction in addition to the medium type and the signature type.

(9) All or part of the functional units of each of the above devices may be composed of a removable IC card or a single module. The IC card or the single module is a computer system composed of a microprocessor, a ROM, a RAM, and the like. The IC card or the module may include a super-multifunctional LSI. Functions of the IC card or the module are achieved by the microprocessor operating in accordance with the computer program. The IC card or the module may be tamper-resistant.

(10) The present invention may be the above methods. Also, the present invention may be a computer program that realizes the methods by a computer, or a digital signal composed of the computer program.

Furthermore, the present invention may be a computer-readable storage medium such as a flexible disk, a hard disk, a CD-ROM, an MO, a DVD, a DVD-ROM, a DVD-RAM, a BD (Blu-ray Disc), and a semiconductor memory, which stores the computer program or the digital signal. Furthermore, the present invention may be the computer program or the digital signal stored on the storage medium.

Furthermore, the present invention may be the computer program or the digital signal transmitted via an electric communication network, a wireless or wired communication network, a network such as Internet, data broadcasting, and the like.

Furthermore, the present invention may be a computer system that includes a microprocessor and a memory, and the microprocessor may operate in accordance with the computer program, and the memory may store therein the computer program.

Furthermore, the program or the digital signal may be executed by another independent computer system, by transferring the program or the digital signal to the recording medium, or by transferring the program or the digital signal via a network or the like.

(11) The present invention also includes the following cases.

The present invention provides a playback device for playing back a digital content, the playback device comprising: an I/O unit operable to receive the content, a program necessary for playing back the content, a medium type of a recording medium in which the content and the program are recorded; a signature type judgment unit operable to judge a signature type of a signature attached to the program; a medium type judgment unit operable to judge the medium type of the recording medium; and a playback permission determination unit operable to determine whether to permit playback of the content, based on results of the judgments made by the signature type judgment unit and the medium type judgment unit.

The present invention provides the playback device, further comprising a signature verification unit operable to verify the signature attached to the program, wherein if the signature is not authentic as a result of the verification made by the signature verification unit, the content is not played back.

The present invention provides the playback device, wherein the signature verification unit stores therein at least two keys for performing signature verification, and determines which of the at least two keys is to be used for verifying a signature depending on a signature type of the signature.

The present invention provides the playback device, further comprising an encryption judgment unit operable to judge whether the content is encrypted, wherein the playback permission determination unit determines whether to permit playback of the content, based on a result of the judgment made by the encryption judgment unit and one of results of the judgments made by the signature type judgment unit and the medium type judgment unit.

The present invention provides the playback device, wherein the playback permission determination unit determines whether to permit playback of the content, based on results of the judgments made by the signature type judgment unit, the medium type judgment unit, the encryption judgment unit.

The present invention provides the playback device, further comprising a signature attachment judgment unit operable to judge whether the content has a signature attached thereto, wherein the playback permission determination unit determines whether to permit playback of the content, based on a result of the judgment made by the signature attachment judgment unit and one of results of the judgments made by the signature type judgment unit and the medium type judgment unit.

The present invention provides the playback device, wherein the playback permission determination unit determines whether to permit playback of the content, based on results of the judgments made by the signature type judgment unit, the medium type judgment unit, and the signature attachment judgment unit.

The present invention provides a recording device for recording a digital content, the recording device comprising an I/O unit operable to receive the content, a program necessary for playing back the content, a medium type of a recording medium in which the content and the program are recorded; a signature type judgment unit operable to judge a signature type of a signature attached to the program; a medium type judgment unit operable to judge a medium type of the recording medium; and a recording permission determination unit operable to determine whether to permit recording of the content, based on results of the judgments made by the signature type judgment unit and the medium type judgment unit.

The present invention provides the recording device, further comprising a signature verification unit operable to verify the signature attached to the program, wherein if the signature is not authentic as a result of the verification made by the signature verification unit, the content is not recorded.

The present invention provides the recording device, wherein the signature verification unit stores therein at least two keys for performing signature verification, and determines which of the at least two keys is to be used for verifying a signature depending on a signature type of the signature.

The present invention provides the recording device, further comprising an encryption judgment unit operable to judge whether the content is encrypted, wherein the recording permission determination unit determines whether to permit recording of the content, based on a result of the judgment made by the encryption judgment unit and one of results of the judgments made by the signature type judgment unit and the medium type judgment unit.

The present invention provides the recording device, wherein the recording permission determination unit determines whether to permit recording of the content, based on results of the judgments made by the signature type judgment unit, the medium type judgment unit, and the encryption judgment unit.

The present invention provides the recording device, further comprising an instruction receiving unit operable to receive an instruction on whether to encrypt the content, wherein the recording permission determination unit determines whether to permit recording of the content, based on the instruction received by the instruction receiving unit and one of results of the judgments made by the signature type judgment unit and the medium type judgment unit.

The present invention provides the recording device, wherein the recording permission determination unit determines whether to permit recording of the content, based on the instruction received by the instruction receiving unit and results of the judgments made by the signature type judgment unit and the medium type judgment unit.

The present invention provides the recording device, further comprising a signature attachment judgment unit operable to judge whether the content has a signature attached thereto, wherein the recording permission determination unit determines whether to permit recording of the content, based on a result of the judgment made by the signature attachment judgment unit and one of results of the judgments made by the signature type judgment unit and the medium type judgment unit.

The present invention provides the recording device, wherein the recording permission determination unit determines whether to permit recording of the content, based on results of the judgments made by the signature type judgment unit, the medium type judgment unit, and the signature attachment judgment unit.

The present invention provides the recording device, further comprising: a signature attachment unit operable to generate a signature for the content and attach the generated signature to the content, or receive a generated signature for the content and attach the received signature to the content; and an instruction receiving unit operable to receive an instruction on whether to attach the signature to the content, wherein the recording permission determination unit determines whether to permit recording of the content, based on the instruction received by the instruction receiving unit and one of results of the judgments made by the signature type judgment unit and the medium type judgment unit.

The present invention provides the recording device, wherein the recording permission determination unit determines whether to permit recording of the content, based on the instruction received by the instruction receiving unit and results of the judgments made by the signature type judgment unit and the medium type judgment unit.

The present invention provides a signature generation device for generating a signature for a program necessary for playing back a digital content and attaching the generated signature to the program, the signature generation device comprising: an I/O unit operable to receive the program and a signature type of the signature to be attached to the program; a signature type storing unit operable to store the received signature type in a signature type storage region included in the program; and a signature generation attachment unit operable to generate a signature for the program in which the signature type is recorded, and attach the generated signature to the program.

The present invention provides the signature generation device, wherein the signature generation attachment unit stores therein at least two keys for performing signature verification, and determines which of the at least two keys is to be used for verifying a signature, depending on a signature type of the signature.

The present invention provides a copyright protection data processing system composed of a signature generation device for generating a signature for a program necessary for playing back a digital content and attaching the generated signature to the program, a recording device for recording the content and the program in a recording medium, and a playback device for playing back the content, wherein the signature generation device comprises: an I/O unit operable to receive the program and a signature type of a signature to be attached to the program; a signature type storing unit operable to store the received signature type in a signature type storage region included in the program; and a signature generation attachment unit operable to generate a signature for the program in which the signature type is stored and attach the generated signature to the program, the recording device comprises an I/O unit operable to receive the content, the program, and a medium type of the recording medium in which the content and the program are recorded; a signature type judgment unit operable to judge the signature type of the signature attached to the program; a medium type judgment unit operable to judge the medium type of the recording medium; and a recording permission determination unit operable to judge whether to permit recording of the content, based on results of the judgments made by the signature type judgment unit and the medium type judgment unit, and the playback device comprises: an I/O unit operable to receive the content, the program, and the medium type of the recording medium in which the content and the program are recorded; a signature type judgment unit operable to judge the signature type of the signature attached to the program; a medium type judgment unit operable to judge the medium type of the recording medium; and a playback permission determination unit operable to determine whether to permit playback of the content, based on results of the judgments made by the signature type judgment unit and the medium type judgment unit.

The present invention provides the copyright protection data processing system, wherein the recording device further comprises a signature verification unit operable to verify the signature attached to the program, and if the signature is not authentic as a result of the verification made by the signature verification unit, the content is not recorded, and the playback device further comprises a signature verification unit operable to verify the signature attached to the program, and if the signature is not authentic as a result of the verification made by the signature verification unit, the content is not played back.

The present invention provides the copyright protection data processing system, wherein the signature generation attachment unit of the signature generation device stores therein at least two keys for performing signature verification, and determines which of the at least two keys is to be used for verifying a signature depending on a signature type of the signature, the signature verification unit of the recording device stores therein at least two keys for performing signature verification, and determines which of the at least two keys is to be used for verifying a signature depending on a signature type of the signature, and the signature verification unit of the playback device stores therein at least two keys for performing signature verification, and determines which of the at least two keys is to be used for verifying a signature depending on a signature type of the signature.

The present invention provides the copyright protection data processing system, wherein the recording device further comprises an encryption judgment unit operable to judge whether the content is encrypted, the recording permission determination unit determines whether to permit recording of the content, based on a result of the judgment made by the encryption judgment unit and one of results of the judgments made by signature type judgment unit and the medium type judgment unit, and the playback device further comprises an encryption judgment unit operable to judge whether the content is encrypted, and the recording permission determination unit determines whether to permit playback of the content, based on a result of the judgment made by the encryption judgment unit and one of results of the judgments made by signature type judgment unit and the medium type judgment unit.

The present invention provides the copyright protection data processing system, wherein the recording device further comprises a signature attachment judgment unit operable to judge whether the content has a signature attached thereto, the recording permission determination unit determines whether to permit recording of the content, based on a result of the judgment made by the signature attachment judgment unit and one of results of the judgments made by the signature type judgment unit and the medium type judgment unit, and the playback device further comprises a signature attachment judgment unit operable to judge whether the content has a signature attached thereto, the recording permission determination unit determines whether to permit playback of the content, based on a result of the judgment made by the signature attachment judgment unit and one of results of the judgments made by the signature type judgment unit and the medium type judgment unit.

The present invention provides a playback method of playing back a digital content, the playback method comprising: an inputting step of receiving, a content, a program necessary for playing back the content, a medium type of a recording medium in which the content and the program are recorded; a signature type judgment step of judging a signature type of a signature attached to the program; a medium type judging step of judging the medium type of the recording medium; and a playback permission determination step of determining whether to permit playback of the content, based on results of the judgments made by the signature type judgment step and the medium type judgment step.

The present invention provides a recording method of recording a digital content, the recording method comprising: an inputting step of receiving the content, a program necessary for recording the content, a medium type of a recording medium in which the content and the program are recorded; a signature type judgment step of judging a signature type of a signature attached to the program; a medium type judgment step of judging the medium type of the recording medium; and a recording permission determination step of determining whether to permit recording of the content, based on results of the judgments made by the signature type judgment step and the medium type judgment step.

The present invention provides a signature generation method of generating a signature for a program necessary for playing back a digital content and attaching the generated signature to the program, the signature generation method comprising: an input step of receiving the program and a signature type of a signature to be attached to the program; a signature type storing step of storing the received signature type in a signature type storage region included in the program; and a signature generation attachment step of generating a signature for the program in which the signature type is recorded, and attaching the generated signature to the program.

The present invention provides a program for use in a playback device for playing back a digital content, the program comprising: an inputting step of receiving, the content, a program necessary for playing back the content, a medium type of a recording medium in which the content and the program are recorded; a signature type judgment step of judging a signature type of a signature attached to the program; a medium type judging step of judging the medium type of the recording medium; and a playback permission determination step of determining whether to permit playback of the content, based on results of the judgments made by the signature type judgment step and the medium type judgment step.

The present invention provides the program recorded in a computer-readable recording medium.

The present invention provides an integrated circuit that relates to a playback device for playing back a digital content, the integrated circuit comprising: an I/O unit operable to receive the content, a program necessary for playing back the content, a medium type of a recording medium in which the content and the program are recorded; a signature type judgment unit operable to judge a signature type of a signature attached to the program; a medium type judgment unit operable to judge the medium type of the recording medium; and a playback permission determination unit operable to determine whether to permit playback of the content, based on results of the judgments made by the signature type judgment step and the medium type judgment step.

The present invention provides a recording medium in which a recording device records a digital content and a program to which a signature is attached, the program having the signature attached thereto includes therein a region for storing a signature type of the signature.

(12) The present invention may be any combination of the above embodiment and modifications.

INDUSTRIAL APPLICABILITY

The present invention can be managerially, continuously, and repeatedly used in an industry that sells contents and in an industry that manufactures and sells devices that use the contents.

The invention claimed is:

1. A content playback device for playing back a digital content, the content playback device comprising:
   a processor device;
   an information acquisition unit operable to acquire a content playback program and a digital signature generated for the content playback program from a recording medium in which the digital content, the content playback program, and the digital signature are recorded, the content playback program being a computer program to be used for playing back the digital content, and the digital signature having an official release type or a test release type as a signature type;
   a medium type judgment unit operable to judge whether the recording medium is read-only; a signature verification unit operable to perform verification of the digital signature acquired by the information acquisition unit;
   a signature type judgment unit operable to judge, using the processor device, whether the digital signature has the official release type or the test release type; and
   a playback permission determination unit operable to: (i) prohibit performing processing relating to playback of the digital content by execution of the content playback program if the verification of the digital signature is successful, if the signature type of the digital signature is the official release type, and if the recording medium is judged not to be read-only; and (ii) permit performing the processing relating to playback of the digital content by execution of the content playback program if the verification of the digital signature is successful, if the signature type of the digital signature is the test release type, and if the recording medium is judged not to be read-only.

2. The content playback device of claim 1, wherein the playback permission determination unit permits performing the processing relating to playback of the digital content by execution of the content playback program if the verification of the digital signature is successful, if the signature type of the digital signature is the official release type, and if the recording medium is judged to be read-only.

3. The content playback device of claim 1, wherein the signature verification unit stores therein a first verification key and a second verification key that are different from each other, the first verification key being to be used for verifying a digital signature having the official release type, the second verification key being to be used for verifying a digital signature having the test release type, the signature verification unit performs the verification of the acquired digital signature with use of the first verification key if the signature type of the acquired digital signature is the official release type, and the signature verification unit performs the verification of the acquired digital signature with use of the second verification key if the signature type of the acquired digital signature is the test release type.

4. The content playback device of claim 1, further comprising
a protection judgment unit operable to judge whether the digital content is protected with use of a copyright protection technique, wherein
the playback permission determination unit determines whether to permit performing the processing relating to playback of the digital content by execution of the content playback program, based on whether the verification of the digital signature is successful, whether the signature type of the digital signature is the official release type or the test release type, whether the recording medium is read-only, and a result of the judgment made by the protection judgment unit.

5. A content recording device for recording a digital content in a recording medium, the content recording device comprising:
a processor device;
a storage unit operable to store therein the digital content, a content playback program that is a computer program to be used for playing back the digital content, and a digital signature that is generated for the content playback program and has a test release type or an official release type as a signature type;
a medium type judgment unit operable to judge whether the recording medium is read-only;
a signature verification unit operable to perform verification of the digital signature stored in the storage unit;
a signature type judgment unit operable to judge, using the processor device, whether the digital signature has the official release type or the test release type;
a recording unit operable to perform processing of recording the digital content in the recording medium; and
a recording permission determination unit operable to: (i) prohibit performing the processing of recording the digital content in the recording medium if the verification of the digital signature is successful, if the signature type of the digital signature is the official release type, and if the recording medium is judged not to be read-only; and (ii) permit performing the processing of the digital content in the recording medium, if the verification of the digital signature is successful, if the signature type of the digital signature is the test release type, and if the recording medium is judged not to be read-only.

6. The content recording device of claim 5, wherein the recording permission determination unit permits performing the processing of recording the digital content in the recording medium if the verification of the digital signature is successful, if the signature type of the digital signature is the official release type, and if the recording medium is judged to be read-only.

7. The content recording device of claim 6, wherein the signature verification unit stores therein a first verification key and a second verification key that are different from each other, the first verification key being to be used for verifying a digital signature having the official release type, the second verification key being to be used for verifying a digital signature having the test release type, the signature verification unit performs the verification of the acquired digital signature with use of the first verification key if the signature type of the acquired digital signature is the official release type, and the signature verification unit performs the verification of the acquired digital signature with use of the second verification key if the signature type of the acquired digital signature is the test release type.

8. A digital signature generation device for use with a content recording device, the digital signature generation device comprising:
an acquisition unit operable to acquire a content playback program that is a computer program to be used for playing back a digital content and signature type information indicating whether a signature type of a digital signature to be attached to the content playback program is a test release type or an official release type;
a signature generation attachment unit operable to generate a digital signature having the official release type or a digital signature having the test release type based on the acquired signature type information, and attach the generated digital signature to the content playback program to generate a signature program having the digital signature attached thereto; and
an output unit operable to output the generated signature program,
wherein the content recording device prohibits processing of recording the digital content if verification of the digital signature is successful, if the signature type of the digital signature is the official release type, and if the recording medium is judged not to be read only, and
wherein the content recording device permits the processing of recording the digital content if the verification of the digital signature is successful, if the signature type of the digital signature is the test release type, and if the recording medium is judged not to be read-only.

9. The digital signature generation device of claim 8, wherein the signature generation attachment unit stores therein a first signature key and a second signature key that are different from each other, the first signature key being to be used for generating a digital signature having the official release type, the second verification key being to be used for generating a digital signature having the test release type, and wherein the signature generation attachment unit generates the digital signature with use of the first signature key or the second signature key that corresponds to the digital signature to be attached to the content playback program based on the signature type information.

10. A content playback method for use in a content playback device including a processor device, the playback method comprising:

an information acquisition step of acquiring a content playback program and a digital signature generated for the content playback program, from a recording medium in which a digital content, the content playback program, and the digital signature are recorded, the content playback program being a computer program to be used for playing back the digital content, and the digital signature having an official release type or a test release type as a signature type;

a medium type judgment step of judging whether the recording medium is read-only;

a signature verification step of performing verification of the acquired digital signature;

a signature type judgment step of judging, using the processor device whether the digital signature has the official release type or the test release type; and a playback permission determination step of: (i) prohibiting performing processing relating to playback of the digital content by execution of the content playback program if the verification of the digital signature is successful, if the signature type of the digital signature is the official release type, and if the recording medium is judged not to be read-only; and (ii) permitting performing processing relating to playback of the digital content by execution of the content playback program if the verification of the digital signature is successful, if the signature type of the digital signature is the test release type, and if the recording medium is judged not to be read-only.

11. A content recording method for use in a recording device including a medium type judgment unit, a signature verification unit, a signature type judgment unit, a recording unit, and a recording permission determination unit, wherein the content recording device stores therein a digital content, a content playback program that is a computer program to be used for playing back the digital content, and a digital signature that is generated for the content playback program and has a test release type or an official release type as a signature type;

the content recording method comprising:

a medium type judgment step of judging, by the medium type judgment unit, whether the recording medium is read-only;

a signature verification step of performing, by the signature verification unit, verification of the acquired digital signature;

a signature type judgment step of judging, by the signature type judgment unit, whether the digital signature has the official release type or the test release type;

a recording permission determination step of: (i) prohibiting, by the recording permission determination unit, performing processing of recording the digital content in the recording medium if the verification of the digital signature is successful, if the signature type of the digital signature is the official release type, and if the recording medium is judged not to be read-only; and (ii) permitting, by the recording permission determination unit, performing the processing of recording the digital content in recording medium if the verification of the digital signature is successful, if the signature type of the digital signature whose verification is successful is the test release type, and if the recording medium is judged not to be read-only; and a recording step of performing, by the recording unit, the processing of recording the digital content in the recording medium, wherein the recording step performs the processing if the processing of recording the digital content in the recording medium is permitted in the recording permission determination step.

12. A non-transitory recording medium having a recorded therein a content playback control computer program, wherein when executed by a computer, the content playback control computer program causes the computer to perform a method comprising:

an information acquisition step of acquiring a content playback program and a digital signature generated for the content playback program from a recording medium in which a digital content, the content playback program, and the digital signature are recorded, the content playback program being a computer program to be used for playing back the digital content, and the digital signature having an official release type or a test release type as a signature type;

a medium type judgment step of judging whether the recording medium is read-only;

a signature verification step of performing verification of the acquired digital signature;

a signature type judgment step of judging whether the digital signature has the official release type or the test release type; and a playback permission determination step of: (i) prohibiting performing processing relating to playback of the digital content by execution of the content playback program if the verification of the digital signature is successful, if the signature type of the acquired digital signature is the official release type, and if the recording medium is judged not to be read-only; and (ii) permitting performing processing relating to the playback of the digital content by execution of the content playback program if the verification of the digital signature is successful, if the signature type of the digital signature is the test release type, and if the recording medium is judged not to be read-only.

13. An integrated circuit that relates to a content playback device, the integrated circuit comprising:

a processor device;

an information acquisition unit operable to acquire a content playback program and a digital signature generated for the content playback program from a recording medium in which the digital content, the content playback program, and the digital signature are recorded, the content playback program being a computer program to be used for playing back the digital content, and the digital signature having an official release type or a test release type as a signature type;

a medium type judgment unit operable to judge whether the recording medium is read-only; and a signature verification unit operable to perform verification of the digital signature acquired by the information acquisition unit;

a signature type judgment unit operable to judge, using the processor device, whether the digital signature has the official release type or the test release type; and a playback permission determination unit operable to: (i) prohibit performing processing relating to playback of the digital content by execution of the content playback program if the verification of the digital signature is successful, if the signature type of the digital signature is the official release type, and if the recording medium is judged not to be read-only; and (ii) permit performing the processing relating to playback of the digital content by execution of the content playback program if the verification of the digital signature is successful, if the signature type of the digital signature is the test release type, and if the recording medium is judged not to be read-only.

14. A copyright protection data processing system comprising a signature generation device, a content recording device, and a content playback device, wherein the signature generation device includes:
 a content playback program reception unit operable to receive, from the content recording device, a content playback program that is a computer program to be used for a digital content, and signature type information indicating whether a signature type of a digital signature to be attached to the content playback program is a test release type or an official release type;
 a signature type recording unit operable to attach the signature type information to the content playback program; and
 a signature generation attachment unit operable to generate a digital signature having the official release type or a digital signature having the test release type for the content playback program based on the signature type indicated by the attached signature type information, and attach the generated digital signature to the content playback program to generate a signature program having the digital signature attached thereto; and
 a signature program transmission unit operable to transmit the generated signature program to the content recording device, wherein the content recording device includes:
 a storage unit operable to store therein the digital content and the content playback program;
 a signature type acquisition unit operable to acquire the signature type information;
 a content playback program transmission unit operable to transmit the content playback program and the acquired signature type information to the signature generation device;
 a signature program reception unit operable to receive the signature program from the signature generation device; and
 a content recording unit operable to record the digital content and the signature program in the recording medium, and wherein the content playback device includes:
 an information acquisition unit operable to acquire the signature program from the recording medium;
 a medium type judgment unit operable to judge whether the recording medium is read-only;
 a signature verification unit operable to perform verification of the digital signature acquired by the information acquisition unit;
 a signature type judgment unit operable to judge whether the digital signature has the official release type or the test release type; and
 a playback permission determination unit operable to: (i) prohibit performing playback of the digital content by execution of the content playback program if the verification of the digital signature is successful, if the signature type of the digital signature attached is the official release type, and if the recording medium is judged not to be read-only; and (ii) permit performing playback of the digital content by execution of the content playback program if the verification of the digital signature is successful, if the signature type of the digital signature is the test release type, and if the recording medium is judged not to be read-only.

* * * * *